(12) United States Patent
Nagai et al.

(10) Patent No.: US 10,522,816 B2
(45) Date of Patent: Dec. 31, 2019

(54) LITHIUM SECONDARY BATTERY

(71) Applicant: TOYOTA JIDOSHA KABUSHIKI KAISHA, Toyota-shi, Aichi-ken (JP)

(72) Inventors: Hiroki Nagai, Nagoya (JP); Masahiro Morita, Toyota (JP); Yukihiro Okada, Shijyonawate (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/960,083

(22) Filed: Apr. 23, 2018

(65) Prior Publication Data

US 2018/0241029 A1    Aug. 23, 2018

Related U.S. Application Data (62) Division of application No. 13/522,744, filed as application No. PCT/JP2010/050726 on Jan. 21, 2010, now abandoned.

(51) Int. Cl.
*H01M 4/13*     (2010.01)
*H01M 4/62*     (2006.01)
*H01M 10/052*   (2010.01)
*H01M 4/02*     (2006.01)

(52) U.S. Cl.
CPC .............. *H01M 4/13* (2013.01); *H01M 4/625* (2013.01); *H01M 10/052* (2013.01); *H01M 2004/021* (2013.01); *Y02E 60/122* (2013.01); *Y02P 70/54* (2015.11); *Y10T 29/49108* (2015.01)

(58) Field of Classification Search
None
See application file for complete search history.

(56) References Cited

U.S. PATENT DOCUMENTS

| | | | |
|---|---|---|---|
| 2006/0134521 A1 | 6/2006 | Shima | |
| 2009/0169997 A1 | 7/2009 | Saruwatari et al. | |
| 2010/0012403 A1 | 1/2010 | Fujita et al. | |
| 2010/0119945 A1 | 5/2010 | Akagi et al. | |
| 2010/0209771 A1* | 8/2010 | Shizuka ................ | B82Y 30/00 429/207 |

(Continued)

FOREIGN PATENT DOCUMENTS

| | | |
|---|---|---|
| CN | 101536220 | 9/2009 |
| JP | 9-161772 | 6/1997 |
| JP | 2002-83585 | 3/2002 |

(Continued)

OTHER PUBLICATIONS

International Search Report in International Application No. PCT/JP2010/050726; dated Apr. 27, 2010.

(Continued)

*Primary Examiner* — Daniel S Gatewood
(74) *Attorney, Agent, or Firm* — Finnegan, Henderson, Farabow, Garrett & Dunner, LLP (57) ABSTRACT

A lithium secondary battery of the present invention has a positive electrode is provided with a positive electrode mix layer that includes a positive electrode active material and a conductive material. The positive electrode mix layer has two peaks, large and small, of differential pore volume over a pore size ranging from 0.01 μm to 10 μm in a pore distribution curve measured by a mercury porosimeter. A pore size of the smaller peak B of the differential pore volume is smaller than a pore size of the larger peak A of the differential pore volume.

3 Claims, 4 Drawing Sheets

(56) References Cited

U.S. PATENT DOCUMENTS

2011/0003200 A1  1/2011  Shizuka et al.

FOREIGN PATENT DOCUMENTS

| | | | |
|---|---|---|---|
| JP | 2002-203603 | 7/2002 | |
| JP | 2003-249224 | 9/2003 | |
| JP | 2005-123179 | 5/2005 | |
| JP | 2005-267953 | 9/2005 | |
| JP | 2005267953 A * | 9/2005 | |
| JP | 2007-049029 | 2/2007 | |
| JP | 2008-108649 | 5/2008 | |
| JP | 2008-270161 | 11/2008 | |
| JP | 2008-282804 | 11/2008 | |
| JP | 2008-305688 | 12/2008 | |
| JP | 2009-81130 | 4/2009 | |
| JP | 2009-158396 | 7/2009 | |
| JP | 2009-164140 | 7/2009 | |
| KR | 10-2009-0092268 | 8/2009 | |
| WO | WO 2006/129756 A1 | 12/2006 | |
| WO | WO 2008/078695 A1 | 7/2008 | |
| WO | WO 2008/126824 A1 | 10/2008 | |
| WO | WO 2009/031619 A1 | 3/2009 | |
| WO | WO-2009031619 A1 * | 3/2009 | ............. B82Y 30/00 |

* cited by examiner

FIG.1

Sa: TOTAL PORE VOLUME ENCOMPASSING
      THE LARGE PORE SIZE PEAK A $(cm^3/g)$
Sb: TOTAL PORE VOLUME ENCOMPASSING
      THE SMALL PORE SIZE PEAK B $(cm^3/g)$

PORE VOLUME PER UNIT MASS (cm³/g)
OF CONDUCTIVE MATERIAL FOR PORES
THAT ENCOMPASS THE SMALL PORE SIZE PEAK B

LITHIUM SECONDARY BATTERY

CROSS-REFERENCE TO RELATED APPLICATIONS

This application is a divisional of U.S. application Ser. No. 13/522,744, which is a national phase of International Application No. PCT/JP2010/050726, filed Jan. 21, 2010, the contents of both of which are incorporated herein by reference.

TECHNICAL FIELD

The present invention relates to a lithium secondary battery and a production method of the battery, and more particularly, to a positive electrode of the battery.

BACKGROUND ART

Recent years have witnessed the growing importance of secondary batteries, such as lithium secondary batteries and nickel-hydride batteries, as vehicle-mounted power sources having electricity as a drive source, as well as in power sources provided in, for instance, portable terminals and other electronic devices. In particular, lithium secondary batteries (typically lithium ion batteries) that are lightweight and afford high energy density are expected to be used as preferred high-output power sources installed in vehicles (for instance, automobiles, in particular hybrid automobiles and electric automobiles).

Batteries that afford good electric performance over long periods of time, i.e. batteries having superior durability (cycle characteristic), are demanded in lithium secondary batteries, as the abovementioned vehicle-mounted high-output power source, that have a configuration wherein rapid charge and discharge (so-called high-rate charge and discharge) are performed repeatedly. One issue being addressed regarding the above demand relates to the improvement of the structure of electrode mix layers (positive electrode mix layer and negative electrode mix layer) that are capable of reversibly storing and releasing charge carriers (lithium ions) and that are formed on the surface of an electrode collector, in such a manner so as to achieve a better high-rate characteristic and cycle characteristic.

Patent Literature 1 is an instance of a prior art document concerned with the structure of a positive electrode mix layer in that kind of lithium secondary batteries. Patent Literature 1 aims at enhancing the low-temperature characteristic of a battery by setting a predetermined range of the pore size of a positive electrode mix layer, or of the pore volume per unit weight of a positive electrode active material in the positive electrode mix layer. Patent Literature 2 and Patent Literature 3 are concerned, among other features, with the pore distribution of positive electrode active materials that make up a positive electrode mix layer.

CITATION LIST

Patent Literature

Patent Literature 1: WO 2006/129756
Patent Literature 2: Japanese Patent Application Publication No. 2009-164140
Patent Literature 3: Japanese Patent Application Publication No. 2009-081130

SUMMARY OF INVENTION

However, Patent Literature 1 is not found to sufficiently address the technical issue relating to the structure of a positive electrode mix layer having good conductivity, which is arguably another issue that demands consideration in lithium secondary batteries that are excellent in high-rate characteristic or cycle characteristic. For instance, not enough is disclosed regarding the state of pores (voids) in the positive electrode mix layer that is formed, and which depends on the structure of the positive electrode mix layer with consideration to the content of a conductive material i.e. which depends on the materials that make up the positive electrode mix layer, even if a powder (conductive material) of a high-conductivity material is incorporated into the positive electrode mix layer for the purpose of compensating conductivity. As a result, good conductive paths (conduction paths) may fail to be formed in the positive electrode mix layer, and thus internal resistance may rise upon use of such a lithium secondary battery that is configured for repeated high-rate charge and discharge.

Accordingly, it is an object of the present invention, conceived in order to solve the above conventional problems relating to lithium secondary batteries, to provide a lithium secondary battery that has a superior battery characteristic (high-rate characteristic or cycle characteristic), as a vehicle-mounted high-output power source, by specifying a pore distribution state according to the content of conductive material in a positive electrode mix layer.

The present invention, which aims at attaining the above goal, provides a lithium secondary battery that is provided with a positive electrode having a positive electrode collector and a positive electrode mix layer that has, on the surface of the collector, a positive electrode active material and a conductive material. As a characterizing feature of the positive electrode mix layer of the lithium secondary battery according to the present invention, the positive electrode mix layer has two peaks, large and small, of differential pore volume over a pore size ranging from 0.01 μm to 10 μm in a pore distribution curve measured by a mercury porosimeter. From among the large and small peaks, a pore size in a smaller peak B of the differential pore volume is constituted by a smaller pore size than a pore size in a larger peak A of the differential pore volume.

In the present description, the term "lithium secondary battery" denotes a secondary battery wherein lithium ions are used as electrolyte ions, and the battery is charged and discharged through migration of lithium ions between a positive and a negative electrode. Secondary batteries ordinarily referred to as lithium ion batteries are a typical example of the lithium secondary battery in the present description.

In the present description, the term "positive electrode active material" in a secondary battery denotes an active material, on the positive electrode side, capable of reversibly storing and releasing (typically inserting removing) a chemical species (herein, lithium ions) that constitutes a charge carrier.

The inventors found that in a positive electrode of a lithium secondary battery having a superior high-rate characteristic or cycle characteristic, the presence of multiple pores (in particular, pores having a small pore size and that derive from gaps between conductive material particles) that are in an appropriate state, in a positive electrode mix layer, resulted in impregnation (retention) of a nonaqueous electrolyte solution into the pores, and in the formation of good conductive paths (conduction paths). The inventors perfected the present invention on the basis of that finding.

The lithium secondary battery according to the present invention is provided with a positive electrode that has a positive electrode mix layer comprising a positive electrode active material and a conductive material, wherein a pore distribution curve of the positive electrode mix layer, as measured using a mercury porosimeter, exhibits two peaks, large and small, of differential pore volume, such that the pore size of the smaller peak B of differential pore volume from among the two peaks, large and small, is smaller than the pore size of the larger peak A of differential pore volume.

In the pore distribution curve, preferably, a pore size P [μm] of a minimum value between the large and small peaks lies in a range from 0.1 μm to 0.7 μm.

The conductive material comprising a conductive powder material such as carbon powder or the like, from among the materials that make up the above positive electrode mix layer, is of high bulkiness and has a very small particle size (typically, no greater than 1 μm, for instance ranging from 0.001 μm to 1 μm). By contrast, the material used in the positive electrode active material that uses a lithium-transition metal complex oxide has a particle size greater than the particle size of the conductive material (typically, from 1 μm to 50 μm, preferably from 2 μm to 20 μm, for instance from 3 μm to 8 μm). Therefore, it is deemed that, in the above-described pore distribution curve, the large pore size peak A denotes roughly pores that are derived from gaps between positive electrode active material particles, and the small pore size peak B does roughly pores derived from gaps between conductive material particles. In the present invention, forming thus pores that comprise a large pore size peak A and a small pore size peak B, such as the above-described ones, in the positive electrode mix layer, has the effect of enhancing the holding force of the nonaqueous electrolyte solution in the pores. As a result, lithium ions migrate efficiently via the electrolyte solution that impregnates (is held in) the pores. In consequence, a lithium secondary battery can be provided that has superior battery performance (cycle characteristic or high-rate characteristic) even when used in a mode of repeated high-rate charge and discharge.

In a preferred mode of the lithium secondary battery provided by the present invention, a total pore volume per unit mass (cumulative pore volume) of the conductive material for pores having a pore size smaller than the pore size P [μm] and encompassing the small pore size peak B, in the pore distribution curve, satisfies a range of 0.18 cm$^3$/g to 0.8 cm$^3$/g.

The small pore size peak B from among the two peaks, large and small, in the pore distribution curve, denotes roughly pores that are formed by gaps between conductive material particles. Therefore, a suitable amount of nonaqueous electrolyte solution can be sufficiently held in pores formed by gaps between conductive material particles in a lithium secondary battery wherein the total pore volume per unit mass of conductive material satisfies 0.18 cm$^3$/g to 0.8 cm$^3$/g for pores that have a pore size smaller than the pore size P [μm] and that encompass the small pore size peak B (typically, a pore size ranging from 0.01 μm to P [μm]). The conductivity of the positive electrode mix layer is enhanced thereby, and a lithium secondary battery having superior battery performance (cycle characteristic or high-rate characteristic) can be provided as a result.

In another preferred mode of the lithium secondary battery provided by the present invention, a total pore volume Sb [cm$^3$/g] of pores having a pore size smaller than the pore size P [μm] and encompassing the small pore size peak B, in the pore distribution curve, is smaller than a total pore volume Sa [cm$^3$/g] of pores having a pore size larger than the pore size P [μm] and encompassing the large pore size peak A.

More preferably, a ratio (Sb/Sa) of the total pore volume Sb [cm$^3$/g] to the total pore volume Sa [cm$^3$/g] satisfies $0.4 < (Sb/Sa) < 1$.

In terms of pore number, the pores comprising small pore sizes are present in numbers greater than or comparable to those of pores comprising a large pore size, in the positive electrode mix layer of the lithium secondary battery formed in such a manner that the total pore volume Sb [cm$^3$/g] that encompasses the small pore size peak B and the total pore volume Sa [cm$^3$/g] that encompasses the large pore size peak A satisfy the above relationship. The occurrence of salt concentration unevenness caused by leaching of electrolyte solution out of the pole group system during charge and discharge can be suppressed by causing the nonaqueous electrolyte solution to impregnate (be held) temporarily in such pores comprising a small pore size, rather than in pores comprising a large pore size. As a result, lithium ions migrate with good efficiency, via the electrolyte solution that impregnates the pores in the positive electrode mix layer, and there can be provided a lithium secondary battery in which rises in internal resistance are suppressed also for high-rate charge and discharge.

In another preferred mode of the provided lithium secondary battery, at least one type selected from the group consisting of acetylene black, furnace black, Ketchen black and graphite powder is used as a conductive material comprised in the positive electrode mix layer.

The material having good conductivity and having a smaller particle size than that of the positive electrode active material forms gaps (pores) of small pore size in the positive electrode mix layer. As a result, such pores are readily impregnated by a nonaqueous electrolyte solution, and a lithium secondary battery can be provided that has excellent conduction efficiency.

In a preferred mode, a layer density of the positive electrode mix layer ranges from 1.5 g/cm$^3$ to 2.8 g/cm$^3$.

Good conduction paths and a good liquid-holding structure are formed, wherein pores are present that comprise large pore sizes and small pore sizes, in a positive electrode mix layer formed in such a manner that a mass per unit volume (layer density) of a positive electrode mix layer, made up of solid materials such as the positive electrode active material and the conductive material (and which include additives such as a binder), ranges from 1.5 g/cm$^3$ to 2.8 g/cm$^3$. In consequence, a lithium secondary battery can be provided that has superior battery performance (cycle characteristic or high-rate characteristic) even when used in a mode of repeated high-rate charge and discharge.

In another aspect, the present invention provides a method for producing a lithium secondary battery. The production method provided by the present invention is a method for producing a lithium secondary battery that is provided with a positive electrode that has a positive electrode collector and a positive electrode mix layer that includes, on a surface of the collector, a positive electrode active material and a conductive material, the method comprising the steps of: (1) forming the positive electrode mix layer on a surface of the positive electrode collector, (2) measuring a pore distribution of the positive electrode mix layer in use of a mercury porosimeter, and selecting a positive electrode such that the pore distribution curve obtained on the basis of the measurement satisfy the conditions below:

(a) there are two peaks, large and small, of differential pore volume in a pore size ranging from 0.01 μm to 10 μm; and (b) from among the large and small peaks, a pore size in a smaller peak B of the differential pore volume is smaller than a pore size in a larger peak A of the differential pore volume; and (3) constructing a lithium secondary battery by using the selected positive electrode.

Such a production method allows forming, in a positive electrode mix layer, pores that comprise the large pore size peak A and small pore size peak B. The holding force of the nonaqueous electrolyte solution in the pores is enhanced thereby, and migration of lithium ions via the electrolyte solution that impregnates (is held in) the pores takes place efficiently as a result. In consequence, a lithium secondary battery can be produced that has superior battery performance (cycle characteristic or high-rate characteristic) even when used in a mode of repeated high-rate charge and discharge.

Preferably, a positive electrode is selected that exhibits a pore size P [μm] of a minimum value between the large and small peaks in the pore distribution curve obtained by the measurement ranging from 0.1 μm to 0.7 μm.

In a preferred mode of a production method of a lithium secondary battery provided by the present invention, a positive electrode is selected that exhibits, as a further condition, a total pore volume per unit mass of the conductive material for pores having a pore size smaller than the pore size P [pun] and encompassing the small pore size peak B, in the pore distribution curve obtained by the measurement, satisfying a range of 0.18 $cm^3/g$ to 0.8 $cm^3/g$.

The small pore size peak B from among the two peaks, large and small, in the pore distribution curve, denotes roughly pores that are formed by gaps between conductive material particles. Therefore, a suitable amount of nonaqueous electrolyte solution can be sufficiently held in pores formed by gaps between conductive material particles in a lithium secondary battery wherein the total pore volume per unit mass of conductive material satisfies 0.18 $cm^3/g$ to 0.8 $cm^3/g$ for pores that have a pore size smaller than the pore size P [μm] and that encompass the small pore size peak B (typically, a pore size ranging from 0.01 μm to P [μm]). Therefore, ion diffusivity and salt concentration homogeneity in a pole group are enhanced thereby, and a lithium secondary battery having superior battery performance (cycle characteristic or high-rate characteristic) can be produced as a result.

The present invention provides also a vehicle that is equipped with any one of the lithium secondary batteries disclosed herein. The lithium secondary battery provided by the present invention may be a lithium secondary battery that exhibits a battery characteristic (cycle characteristic or high-rate characteristic) that makes the battery appropriate as a motive power source installed in vehicles. Therefore, such a lithium secondary battery can be appropriately used as a power source for motors (electric motors) installed in a vehicle, such as an automobile, provided with an electric motor, for instance, a hybrid automobile, an electric automobile or a fuel cell automobile.

DESCRIPTION OF EMBODIMENTS

Preferred embodiments of the present invention are explained next. Any features other than the features specifically set forth in the present description and which may be necessary for carrying out the present invention can be regarded as design matter for a person skilled in the art on the basis of known techniques in the technical field in question. The present invention can be carried out thus on the basis of the features disclosed in the present description and on the basis of common technical knowledge in the technical field in question.

The various constituent elements of a positive electrode of the lithium secondary battery according to the present embodiment are explained first. As described above, the lithium secondary battery (typically, a lithium ion battery) disclosed herein comprises a positive electrode wherein a positive electrode mix layer that comprises a positive electrode active material and a conductive material are formed on the surface of a positive electrode collector. The positive electrode mix layer may comprise a powdery conductive material and a powdery positive electrode active material capable of storing and releasing lithium ions as charge carriers.

The positive electrode active material comprised in the positive electrode mix layer is not particularly limited, and there can be used one, two or more types of materials that are conventionally used in lithium secondary batteries, so long as the object of the present invention can be achieved. Examples of typical positive electrode active materials include, for instance, lithium-transition metal complex oxides having a lamellar halite structure, spinel structure or the like. Examples include, for instance, complex oxides that comprise lithium (Li) and at least one type of transition metal element, for instance lithium-nickel complex oxides, lithium-cobalt complex oxides, lithium-manganese complex oxides and lithium-nickel-cobalt-manganese complex oxides.

As used herein, the term lithium-nickel complex oxide includes oxides of lithium (Li) and nickel (Ni) as constituent metal elements, and oxides that comprise, as constituent metal elements, at least one metal element other than Li and Ni (i.e. a transition metal element and/or typical metal element other than Li and Ni), typically in a proportion smaller than that of Ni (proportion in number of atom terms; in case of two or more metal elements other than Li and Ni, total sum thereof smaller than that of Ni). The metal element other than Li and Ni may be one, two or more metal elements selected from the group consisting of calcium (Ca), cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce). The same applies to lithium-cobalt complex oxides and lithium-manganese complex oxides.

Alternatively, the complex oxide may be a binary-system lithium-transition metal complex oxide comprising a plurality of transition metal elements other than lithium, represented by, for instance, a nickel-manganese system $LiNi_xMn_{1-x}O_2$ ($0<x<1$) or $LiNi_xMn_{2-x}O_4$ ($0<x<2$), a nickel-cobalt system $LiNi_xCo_{1-x}O_2$ ($0<x<1$), or a cobalt-manganese system $LiCoMn_{1-x}O_2$ ($0<x<1$). Alternatively, the complex oxide may be a ternary lithium-transition metal complex oxide (typically $LiNi_{1/3}Co_{1/3}Mn_{1/3}O_2$), such as a nickel-cobalt-manganese system. Herein, an olivine-type lithium phosphate represented by formula $LiMPO_4$ (where M is at least one or more element from among Co, Ni, Mn and Fe, as represented by $LiFePO_4$ and $LiMnPO_4$) may be used as the positive electrode active material.

A positive electrode active material can be used that has a tap density of about 0.5 $g/cm^3$ to 3 $g/cm^3$, preferably from about 1.0 $g/cm^3$ to 2.0 $g/cm^3$, and having an average particle size ranging typically from 1 μm to 50 μm, preferably from 2 μm to 20 μm, for instance from 3 μm to 8 μm. As used herein, the term "average particle size" denotes a median size (D50: 50% volume average particle size) worked out from a particle size distribution that is measured on the basis of a particle size distribution measurement device in accordance with a laser scattering/diffraction method.

For instance, a lithium-transition metal complex oxide powder that is prepared and provided in accordance with a conventional known method may be used, as-is, as the abovementioned lithium-transition metal complex oxide that can be used as a positive electrode active material. For instance, various starting material compounds appropriately selected in accordance with the atomic composition are mixed at a predetermined molar ratio, and are fired by appropriate means, so that the abovementioned oxide can be prepared as a result. A particulate lithium-transition metal complex oxide powder that is made up substantially of particles having a given tap density and/or average particle size can be then obtained through pulverization, granulation and sorting, by appropriate means, of the fired product.

A conductive powder material such as a carbon powder or carbon fibers is preferably used as the conductive material comprised in the positive electrode mix layer. Various kinds of carbon black may be used as the carbon powder. For instance, there may be suitably used at least one type selected from the group consisting of acetylene black, furnace black, Ketchen black and graphite powder. Various types of conductive fibers such as carbon fibers and metal fibers may be incorporated, singly or in mixtures. The foregoing may be used as one type alone, or two or more types may be used concomitantly. The average particle size of the conductive material is not limited, but there can be used a material having an average particle size no greater than 1 μm, preferably an average particle size ranging from 0.001 μm to 1 μm.

The positive electrode mix layer disclosed herein may contain, as the case may require, other arbitrary components such as a binder. As the binder there can be appropriately used a binder identical to those that are utilized in positive electrodes of ordinary lithium secondary batteries. Preferably, a polymer is used that dissolves or that can be dispersed in the solvent that is used.

In a case where, for instance, a nonaqueous solvent is used, a polymer such as polyvinylidene fluoride (PVDF) or polyvinylidene chloride (PVDC) can be preferably used. Such a binder may be used as one type alone, or as two or more types in combination. The polymer materials exemplified herein can be used for the purpose of eliciting, in addition to the function as a binder, also the function of other additives, such as a thickener.

In a case where an aqueous solvent is used, there can be used a polymer that dissolves in an aqueous solvent or a polymer that disperses in an aqueous solvent. Examples of polymers that dissolve in an aqueous solvent include, for instance, a cellulose derivative such as carboxymethyl cellulose (CMC; typically sodium salt), hydroxyethyl cellulose (HEC), hydroxypropyl cellulose (HPC), methylcellulose (MC), cellulose acetate phthalate (CAP), hydroxypropyl methylcellulose (HPMC), hydroxypropyl methylcellulose phthalate (HPMCP) or the like; and polyvinyl alcohol (PVA) or the like. Examples of the polymers that disperse in an aqueous solvent include, for instance, polyethylene oxide (PEO); a fluororesin such as polytetrafluoroethylene (PTFE), a tetrafluoroethylene-perfluoroalkyl vinyl ether copolymer (PFA), a tetrafluoroethylene-hexafluoropropylene copolymer (FEP) or an ethylene-tetrafluoroethylene copolymer (ETFE); a vinyl acetate copolymer, or a rubber such as a styrene-butadiene block copolymer (SBR), an acrylic acid-modified SBR resin (latex SBR), gum arabic or the like.

The mass per unit volume (layer density) of the positive electrode mix layer that is made up of solid materials such as the positive electrode active material, the conductive material, binder and so forth, is not particularly limited, but may range, for instance, from 1.0 $g/cm^3$ to 3.0 $g/cm^3$, preferably from about 1.5 $g/cm^3$ to 2.8 $g/cm^3$.

An aqueous solvent or nonaqueous solvent may be used as the solvent in the lithium secondary battery disclosed herein. The aqueous solvent is typically water, but so long as the solvent is aqueous overall, there can be used preferably water or a mixed solvent having water as a main constituent. Examples of solvents, other than water, that make up the mixed solvent include one, two or more types of appropriately selected organic solvents (for example, lower alcohols and lower ketones) that are homogeneously miscible with water. For instance, an aqueous solvent is preferably used wherein water makes up about 80 wt % or more (preferably, about 90 wt % or more, more preferably about 95 wt % or more) of the solvent. In a particularly preferred example, the solvent comprises essentially water. Appropriate examples of nonaqueous solvents include, for instance, N-methyl-2-pyrrolidone (NMP), methyl ethyl ketone, toluene or the like.

From among the materials that make up the above positive electrode mix layer, the conductive material comprising a conductive powder material such as carbon powder or the like is of high bulkiness and has a very small particle size (typically, no greater than 1 μm, for instance ranging from 0.001 μm to 1 μm). By contrast, the materials used in the positive electrode active material, where a lithium-transition metal complex oxide is utilized, has a particle size greater than the particle size of the conductive material (typically, from 1 μm to 50 μm, preferably from 2 μm to 20 μm, for instance from 3 μm to 8 μm). Therefore, multiple pores become formed in the positive electrode mix layer by the gaps between material particles. A measurement of the pore distribution of such a positive electrode mix layer using a mercury porosimeter yields a pore distribution curve such as the one illustrated in FIG. 1.

Figure 1:
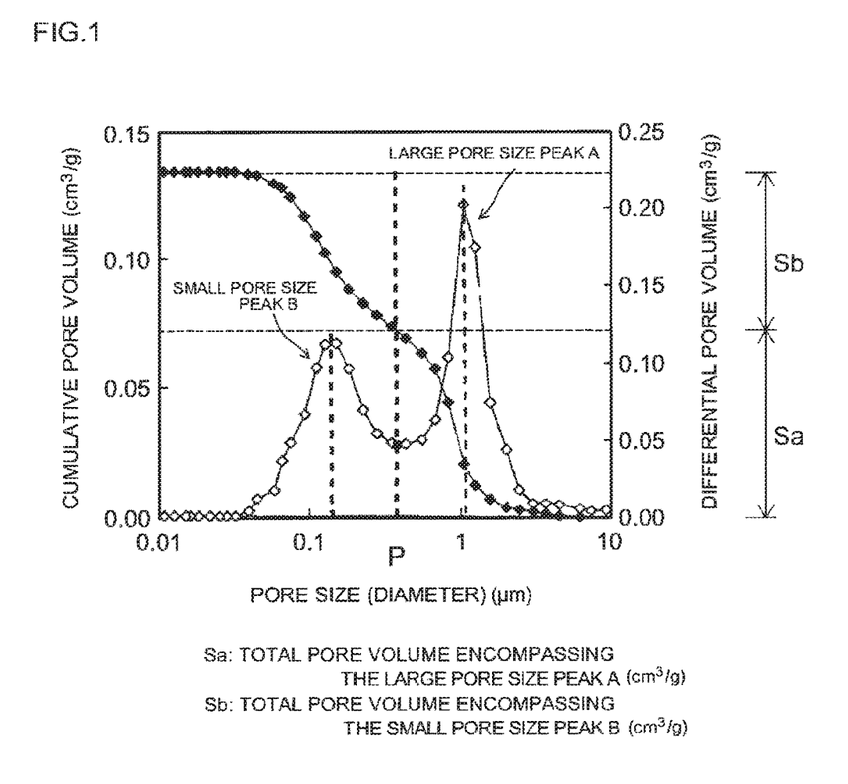
FIG. 1 is a diagram illustrating a pore distribution of a positive electrode mix layer of a lithium secondary battery according to an embodiment.

FIG. 1 is a diagram illustrating a pore distribution state of a positive electrode mix layer of a lithium secondary battery in an embodiment. According to the pore distribution curve (white plot) that illustrates a relationship between pore size and differential pore volume in FIG. 1, the positive electrode mix layer of the lithium secondary battery disclosed herein has a structure that exhibits two peaks, large and small, of differential pore volume, in a pore size ranging from 0.01 μm to 10 μm. Preferably, a pore size P [μm] of the minimum value between the two peaks, large and small, lies within a range from 0.1 μm to 0.7 μm (from about 0.2 μm to 0.7 μm, for instance 0.2 μm to 0.5 μm).

The pore size in the smaller peak B of differential pore volume is smaller than the pore size of the larger peak A of differential pore volume. That is, the above suggests that pores having a large pore size and derived from gaps between positive electrode active material particles having a large particle size, and pores having a small particle size and derived from gaps between conductive material particles having a small particle size, are both present in the positive electrode mix layer. Forming thus pores that comprise a large pore size peak A and a small pore size peak B, such as the above-described ones, in the positive electrode mix layer, has the effect of enhancing the holding force of the nonaqueous electrolyte solution in the pores. As a result, lithium ions migrate efficiently via the electrolyte solution that impregnates (is held in) the pores.

In the pore distribution curve (black plot) that depicts the relationship between pore size and cumulative pore volume, a division arises between pores that encompass the large pore size peak A having a pore size larger than the pore size P [μm], and pores that encompass the small pore size peak B having a pore size smaller than the pore size P [μm], as illustrated in FIG. 1, such that a total pore volume Sb [cm$^3$/g], as the cumulative pore volume of the latter, is configured to be smaller than a total pore volume Sa [cm$^3$/g], as a cumulative pore volume of the former. More preferably, a ratio (Sb/Sa) of the total pore volume Sb [cm$^3$/g] and the total pore volume Sa [cm$^3$/g] satisfies 0.4<(Sb/Sa)<1.

In terms of pore number, pores comprising a small pore size are present in numbers greater than or comparable to those of pores comprising a large pore size, in the positive electrode mix layer of the lithium secondary battery formed in such a manner that the total pore volume Sb [cm$^3$/g] that encompasses the small pore size peak B and the total pore volume Sa [cm$^3$/g] that encompasses the large pore size peak A satisfy the above relationship. The occurrence of salt concentration unevenness caused by leaching of electrolyte solution out of the pole group system during charge and discharge can be suppressed by causing the nonaqueous electrolyte solution to temporarily impregnate (be held) in such pores comprising a small pore size, rather than in pores comprising a large pore size.

In the positive electrode mix layer of lithium secondary battery disclosed herein, moreover, a total pore volume per unit mass of conductive material for pores having a pore size smaller than the pore size P [μm] and that encompass the small pore size peak B (hereafter also referred to as "pore volume per unit mass of conductive material for pores that encompass the small pore size peak B") satisfies a range of 0.18 cm$^3$/g to 0.8 cm$^3$/g (more preferably, 0.18 cm$^3$/g to 0.78 cm$^3$/g, particularly preferably from 0.2 cm$^3$/g to 0.7 cm$^3$/g).

As described above, the small pore size peak B from among the two peaks, large and small, in the pore distribution curve, denotes roughly pores that are formed by gaps between conductive material particles. In a lithium secondary battery where the pore volume per unit mass of conductive material for pores that encompass the small pore size peak B, therefore, a suitable amount of nonaqueous electrolyte solution is sufficiently held in pores formed by gaps between conductive material particles. As a result, lithium ions migrate with good efficiency, via the electrolyte solution that is held in the pores in the positive electrode mix layer, and lithium ion diffusivity, as well as salt concentration homogeneity in the pole group, are enhanced. In consequence, a lithium secondary battery can be provided that has superior battery performance (cycle characteristic or high-rate characteristic) even when used in a mode of repeated high-rate charge and discharge.

The pore distribution in the positive electrode mix layer can be measured as follows. A specimen is prepared by cutting, to a predetermined surface area, a positive electrode in which a positive electrode mix layer is formed on the surface of a positive electrode collector. The pore distribution of the specimen is then measured using a commercially-available mercury porosimeter, at an output of pressure range from about 4 psi to 60000 psi. As a result, a pore distribution curve is obtained that denotes the relationship between pore size and pore volume (typically, a pore distribution curve in the range from 50 μm to 0.003 μm, for the above pressure range), and the pore distribution state formed in the positive electrode mix layer is checked. A conceivable spacing between specimens may be 5 μm or greater.

The pore volume per unit mass of conductive material for pores that encompass the small pore size peak B can be worked out using the obtained pore distribution curve. The cumulative pore volume of pores having a pore size smaller than the pore size P [μm] and that encompass the small pore size peak B, i.e. the total pore volume Sb [cm$^3$/g] is calculated on the basis of the pore distribution curve of FIG. 1 that denotes pore size and cumulative pore volume. The pore volume per unit mass [cm$^3$/g] of the conductive material for pores that encompass the small pore size peak B is obtained by dividing the total pore volume Sb [cm$^3$/g] by the mass ratio of conductive material comprised in the positive electrode mix layer.

A conductive member comprising a metal of good conductivity is preferably used as a positive electrode collector that constitutes the base material of the positive electrode. For instance, there can be used aluminum or an alloy having aluminum as a main component. The shape of the positive electrode collector may vary depending on, for instance, the shape of the lithium secondary battery, and hence is not particularly limited. The shape may be embodied in various ways, for instance in the form of a rod, plate, sheet, foil, mesh or the like.

An explanation follows next on a positive electrode production method as an example of a preferred mode of a production method of a lithium secondary battery according to the present invention.

The production method disclosed herein is a method for producing a lithium secondary battery that is provided with a positive electrode wherein a positive electrode mix layer comprising a positive electrode active material and a conductive material is formed on the surface of a positive electrode collector. The production method used herein may be identical to a production method of a positive electrode that is used conventionally. Specifically, the method comprises the steps below.

(1) forming the positive electrode mix layer on the surface of the positive electrode collector;

(2) measuring the pore distribution of the positive electrode mix layer using a mercury porosimeter, and selecting a positive electrode such that the pore distribution curve obtained on the basis of the measurement satisfy the conditions below:

(a) having two peaks, large and small, of differential pore volume, in a pore size range from 0.01 μm to 10 μm; and (b) from among the two peaks, large and small, the pore size of a smaller peak B of differential pore volume is smaller than the pore size in a larger peak A of differential pore volume;

(3) constructing a lithium secondary battery using the selected positive electrode.

Firstly, materials for forming a positive electrode mix layer such as a positive electrode active material, a conductive material and a binder, are added to an appropriate solvent (aqueous solvent or nonaqueous solvent), and the whole is kneaded, to prepare a paste- or slurry-like composition for forming a positive electrode mix layer. The positive electrode active material is not particularly limited. A positive electrode active material can be used that has a tap density of about 0.5 g/cm$^3$ to 3 g/cm$^3$, preferably from about 1.0 g/cm$^3$ to 2.0 g/cm$^3$, and having an average particle size ranging typically from 1 μm to 50 μm, preferably from 2 μm to 20 μm, for instance from 3 μm to 8 μm.

Next, the surface of the positive electrode collector was coated in such a manner that the coating amount of the above composition ranged from 12 mg/cm$^2$ to 20 mg/cm$^2$. The solvent was dried through volatilization. This was followed by compression (pressing) in such a manner that the layer density of the positive electrode mix layer ranged from 1.0 g/cm$^3$ to 3.0 g/cm$^3$, preferably from about 1.5 g/cm$^3$ to 2.8 g/cm$^3$, to produce a positive electrode for lithium secondary batteries.

A method identical to a conventional method can be used as the method for coating the above composition on the positive electrode collector. For instance, the abovementioned paste can be appropriately coated onto the positive electrode collector, by using an appropriate coating device such as a slit coater, die coater, gravure coater, comma coater or the like. The solvent can be satisfactorily dried by natural drying, hot air, low-humidity air, vacuum, infrared, far infrared, electron beams or the like, singly or in combination. As the compression method there can be used a compression method such as conventionally known roll pressing, plate pressing or the like. Upon thickness adjustment, thickness may be measured with a film-thickness measurement instrument, and compression may be performed a plurality of times, while adjusting the pressing pressure, to yield a desired thickness.

After formation of a positive electrode mix layer, the positive electrode is cut to a predetermined surface area, the pore distribution of the positive electrode mix layer is measured using a mercury porosimeter, and there is selected a positive electrode such that the pore distribution curve obtained on the basis of the above measurement satisfy the conditions below. The conditions are: (a) having two peaks, large and small, of differential pore volume, in a pore size range from 0.01 μm to 10 μm; and (b) from among the two peaks, large and small, the pore size of the smaller peak B of differential pore volume is smaller than the pore size of the larger peak A of differential pore volume. More preferably, there is selected a positive electrode such that the total pore volume per unit mass of conductive material for pores having a pore size smaller than the pore size P [μm] and that encompass the small pore size peak B, in the pore distribution curve obtained in accordance with the above measurement, satisfies a range of 0.18 cm$^3$/g to 0.8 cm$^3$/g (more preferably, 0.18 cm$^3$/g to 0.78 cm$^3$/g, particularly preferably from 0.2 cm$^3$/g to 0.7 cm$^3$/g).

The positive electrode having pores that comprise the large pore size peak A and the small pore size peak B in the positive electrode mix layer exhibits enhanced holding force of nonaqueous electrolyte solution in the pores. As a result, lithium ions migrate efficiently via the electrolyte solution that impregnates (is held in) the pores. In consequence, constructing a lithium secondary battery using the above-mentioned selected positive electrode makes it possible to provide a lithium secondary battery can be provided that has superior battery performance (cycle characteristic or high-rate characteristic) even when used in a mode of repeated high-rate charge and discharge.

An explanation follows next on the various constituent elements of the negative electrode of the lithium secondary battery disclosed herein. Such a negative electrode has a configuration wherein a negative electrode mix layer is formed on the surface of the negative electrode collector. A conductive member comprising a metal of good conductivity is preferably used as a negative electrode collector that constitutes the base material of the negative electrode. For instance, there can be used copper or an alloy having copper as a main component. The shape of the negative electrode collector may vary depending on, for instance, the shape of the lithium secondary battery, and hence is not particularly limited. The shape may be embodied in various ways, for instance in the form of a rod, plate, sheet, foil, mesh or the like. A copper foil having a thickness ranging from about 5 to 100 μm is appropriately used as the collector of the negative electrode of the lithium secondary battery that is used as a vehicle-mounted high-output power source.

A negative electrode active material capable of storing and releasing lithium ions that constitute charge carriers is comprised in the negative electrode mix layer that is formed on the surface of the negative electrode collector. The negative electrode active material is not particularly limited, and there can be used one, two or more materials that are conventionally used in lithium secondary batteries. Examples thereof include, for instance, carbon particles. Preferably, there is used a particulate carbon material (carbon particles) comprising, at least in part, a graphite structure (lamellar structure). Any material from among so-called graphitic materials (graphite), non-graphitizable carbonaceous materials (hard carbon) and graphitizable carbonaceous materials (soft carbon), as well as materials having a structure that is a combination of the foregoing, can be appropriately used as the carbon material. Graphite particles, in particular, can be preferably used among the foregoing. Graphite particles (for instance, graphite) have excellent conductivity, since they can store appropriately lithium ions as charge carriers. Graphite particles have a small particle size and large surface area per unit volume, and hence a negative electrode active material can be obtained that is yet more suitable for high-rate charge and discharge.

The negative electrode mix layer may typically contain, as constituent components thereof, the above-described negative electrode active material, and, in addition, other arbitrary components, for instance a binder and so forth, as the case may require. As the binder there can be appropriately used a binder identical to those that are utilized in negative electrodes of ordinary lithium secondary batteries. Herein there can be appropriately used various polymer materials that can function as binders and that have been listed above as constituent elements of the positive electrode.

A production method of the negative electrode of the lithium secondary battery is explained next. In order to form the negative electrode mix layer on the surface of the negative electrode collector, firstly the negative electrode active material is mixed with the binder and so forth and an appropriate solvent (aqueous solvent or nonaqueous solvent), to prepare a paste- or slurry-like composition for forming a negative electrode mix layer.

As regards the blending ratio of the various constituent materials, the proportion of the negative electrode active material in the negative electrode mix layer ranges preferably from about 50 wt % or more, more preferably from about 85 to 99 wt % (for instance, 90 to 97 wt %). The proportion of binder in the negative electrode mix layer can be set to, for instance, about 1 to 15 wt %/o, and is ordinarily set to, preferably about 3 to 10 wt %. The composition thus prepared is coated onto the negative electrode collector, the solvent is dried off by volatilization. This is followed by compression (pressing). As a result there is obtained a negative electrode of a lithium secondary battery having the negative electrode mix layer, formed using the abovementioned paste, on the negative electrode collector. The coating, drying and compression methods that can be used herein are conventional known methods identical to those of the above-described method for producing a positive electrode.

An example of a square-shaped lithium secondary battery (lithium ion battery) constructed using the positive electrode disclosed herein is explained in detail next. However, the present invention is not meant to be limited to such an embodiment. Any features other than the features specifically set forth in the present description and which may be necessary for carrying out the present invention (for instance, the configuration and production method of an electrode body that comprises a positive electrode and a negative electrode, the configuration and production method of a separator, as well as ordinary techniques relating to the construction of lithium secondary batteries and other batteries) can be regarded as design matter for a person skilled in the art on the basis of known techniques in the technical field in question.

In the drawings below, members and sites that elicit identical effects are denoted with identical reference numerals, and a recurrent explanation thereof will be omitted or simplified. The dimensional relationships (length, width, thickness and so forth) in the figures do not reflect actual dimensional relationships.

Figure 2:
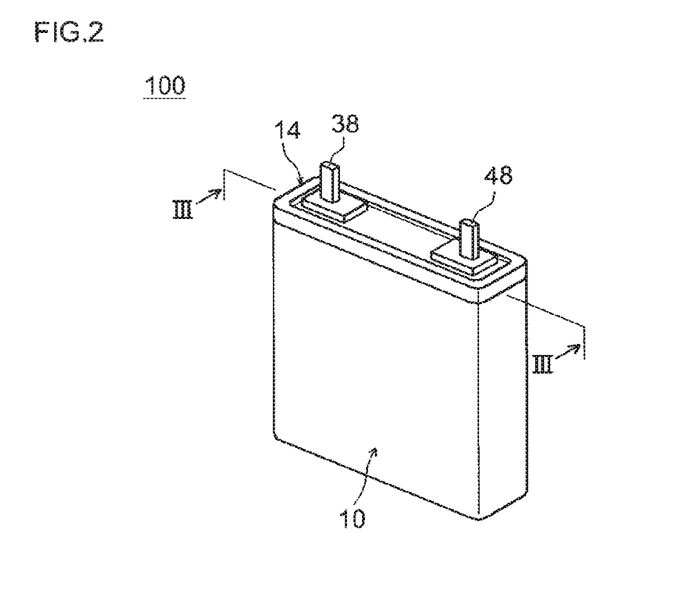
FIG. 2 is a perspective-view diagram illustrating schematically the outer shape of a lithium secondary battery according to an embodiment.
Figure 3:
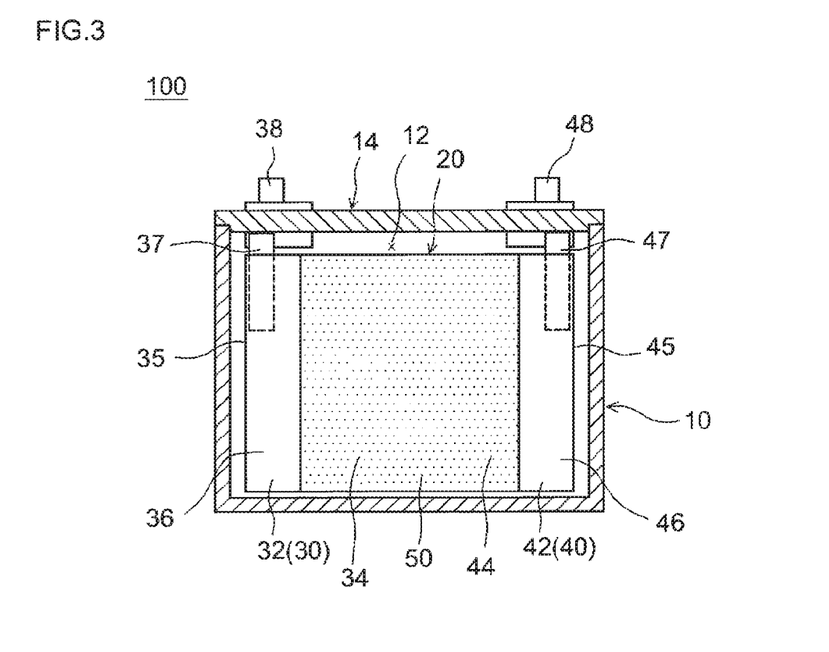
FIG. 3 is a cross-sectional diagram along line III-III in FIG. 2.
Figure 4:
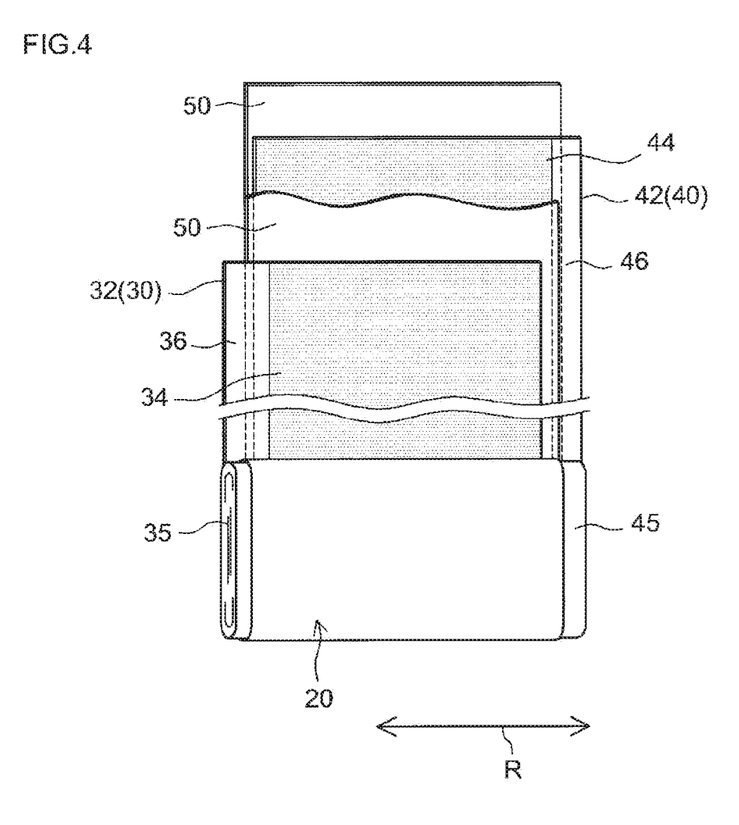
FIG. 4 is a cross-sectional diagram illustrating positive and negative electrodes and a separator that make up a wound electrode body according to an embodiment.

FIG. 2 is a perspective-view diagram illustrating schematically a square-shaped lithium secondary battery according to an embodiment. FIG. 3 is a cross-sectional diagram along line III-III in FIG. 2. FIG. 4 is a perspective-view diagram illustrating schematically the state arrived at through winding of an electrolyte body.

As illustrated in FIG. 2 and FIG. 3, the lithium secondary battery 100 according to the present embodiment comprises a square battery case 10 shaped as a rectangular parallelepiped, and a lid body 14 that plugs an opening 12 of the case 10. A flat-shaped electrode body (wound electrode body 20) and electrolyte can be accommodated in the battery case 10 through the opening 12. A positive electrode terminal 38 for external connection and a negative electrode terminal 48 are provided in the lid body 14, such that part of the terminals 38 and 48 projects beyond the surface side of the lid body 14. Part of the outer terminals 38 and 48 are respectively connected to an internal positive electrode terminal 37 or internal negative electrode terminal 47 inside the case.

The wound electrode body 20 according to the present embodiment is explained next with reference to FIG. 3 and FIG. 4. As illustrated in FIG. 4, the wound electrode body 20 comprises a sheet-like positive electrode sheet 30 having a positive electrode mix layer 34 on the surface of an elongate positive electrode collector 32; an elongate sheet-like separator 50; and a sheet-like negative electrode sheet 40 having a negative electrode mix layer 44 on the surface of an elongate negative electrode collector 42. In a cross-sectional view along the winding axial direction R, the positive electrode sheet 30 and the negative electrode sheet 40 are stacked with two interposed separators 50, namely a stack of positive electrode sheet 30, separator 50, negative electrode sheet 40 and separator 50, in this order. The stack is wound in the form of a tube around an axial core (not shown), and the obtained wound electrode body 20 is squashed from the sides, to impart the latter with a flat shape.

As illustrated in FIG. 3, the wound electrode body 20 according to the present embodiment has, in a central portion thereof in the winding axial direction R, a portion that is a stack resulting from closely superposing a positive electrode mix layer 34 formed on the surface of a positive electrode collector 32, and a negative electrode mix layer 44 formed on the surface of the negative electrode collector 42. The electrode body 20 is stacked in a state where at one end thereof, in a cross-sectional view along the winding axial direction R, a portion at which the positive electrode mix layer 34 is not formed, and at which the positive electrode collector 32 is exposed (positive electrode mix layer non-formation section 36), protrudes beyond the separator 50 and the negative electrode sheet 40 (or beyond the closely stacked portion of the positive electrode mix layer 34 and the negative electrode mix layer 44), at one end portion in direction R. A positive electrode collector stacked portion 35 that results from stacking a positive electrode mix layer non-formation section 36 in the positive electrode collector 32 is formed at an end portion of the electrode body 20. The other end portion of the electrode body 20 is configured as the positive electrode sheet 30. A negative electrode collector stacked portion 45 is formed through stacking of a negative electrode mix layer non-formation section 46 in the negative electrode collector 42. As the separator 50 there is used a separator having a width greater than the width of the stacked portion of the positive electrode mix layer 34 and the negative electrode mix layer 44, and smaller than the width of the electrode body 20. The separator 50 is disposed sandwiched between stacked portions of the positive electrode mix layer 34 and the negative electrode mix layer 44 in such a manner that there occur no internal short-circuits derived from contact between the positive electrode collector 32 and the negative electrode collector 42.

The separator 50, which is a sheet interposed between the positive electrode sheet 30 and the negative electrode sheet 40, is disposed in such a manner so as to come into contact with the positive electrode mix layer 34 of the positive electrode sheet 30 and the negative electrode mix layer 44 of the negative electrode sheet 40. The separator 50 has the role of preventing short-circuits that arise from contact between the two mix layers 34, 44 in the positive electrode sheet 30 and the negative electrode sheet 40, and the role of forming conduction paths (conductive paths) between electrodes through impregnation of the electrolyte (nonaqueous electrolyte solution) into the voids of the separator 50.

As the constituent material of the separator 50 there can be preferably used a porous sheet (micro-porous resin sheet) comprising a resin. A porous polyolefin resin such as polypropylene, polyethylene or polystyrene is particularly preferred.

The lithium secondary battery according to the present embodiment can be constructed in the manner described below. A positive electrode (typically, positive electrode sheet 30) and a negative electrode (typically negative electrode sheet 40) configured as described above are stacked together with two sheets of the separator 50, are then wound, and the obtained wound electrode body 20 is squashed from the sides, to impart the wound electrode body 20 with a flat shape. The internal positive electrode terminal 37 is bonded to the positive electrode mix layer non-formation section 36 of the positive electrode collector 32, and the internal negative electrode terminal 47 is bonded to the negative electrode mix layer non-formation section 46 of the negative electrode collector 42, by ultrasound welding, resistance welding or the like. And electrical connection is established with the positive electrode sheet 30 or the negative electrode sheet 40 of the wound electrode body 20 having been thus flattened. After accommodating the wound electrode body 20 thus obtained in the battery case 10, a nonaqueous electrolyte solution is poured in, and the pouring port is sealed. The lithium secondary battery 100 of the present embodiment can be constructed as a result. The structure, size and materials of the battery case 10 (for instance, whether the battery case 10 is made of metal or a laminate film), the structure of the electrode body having the positive and negative electrodes as main constituents (for instance, winding structure and stacking structure) and other features are not particularly limited.

The nonaqueous electrolyte solution that can be used is not particularly limited and may be identical to nonaqueous electrolyte solutions that are used in conventional lithium secondary batteries. Such nonaqueous electrolyte solutions have typically a composition wherein a supporting salt is incorporated into an appropriate nonaqueous solvent. As the nonaqueous solvent there can be used one, two or more types selected from the group consisting of propylene carbonate (PC), ethylene carbonate (EC), diethyl carbonate (DEC), dimethyl carbonate (DMC), ethyl methyl carbonate (EMC) and the like. As the supporting salt there can be used a lithium compound (lithium salt) such as, for instance, $LiPF_6$, $LiBF_4$, $LiClO_4$, $LiAsF$, $LiCF_3SO_3$, $LiC_4FgSO_3$, $LiN(CF_3SO_2)_2$, $LiC(CF_3SO_2)_3$ and $LiI$. The concentration of the supporting salt in the nonaqueous electrolyte solution is not particularly limited, and may be identical to that of nonaqueous electrolyte solutions used in conventional lithium secondary batteries. An electrolyte can be used wherein an appropriate lithium compound (supporting salt) is incorporated to a concentration ranging from about 0.5 to 1.5 mol/L.

As described above, the lithium secondary battery 100 thus constructed can exhibit a superior battery characteristic (high-rate characteristic or cycle characteristic), as a vehicle-mounted high-output power source. Therefore, the lithium secondary battery 100 according to the present invention can be appropriately used as a power source for motors (electric motors) that are installed, in particular, in a vehicle such as an automobile. Accordingly, the present invention provides a vehicle (typically, an automobile, in particular an automobile provided with an electric motor, for instance a hybrid automobile, an electric automobile or a fuel cell automobile) 1 that is equipped with such a lithium secondary battery 100 as a power source (and which may be embodied in the form of a battery pack of a plurality of the lithium secondary batteries 100 connected in series), as illustrated schematically in FIG. 5.

Test examples relating to the present invention are explained next. However, the present invention is not meant to be limited to such specific examples.

Production of a Positive Electrode of a Test Lithium Secondary Battery

A positive electrode for a test lithium secondary battery was produced. Firstly, to form a positive electrode mix layer of a positive electrode, $Li_{1.0}Ni_{0.34}Co_{0.33}Mn_{0.33}O_2$ having a average particle size ranging from 3 µm to 7 µm and a tap density ranging from about 1.0 g/cm³ to 2.0 g/cm³, as the positive electrode active material, plus polyvinylidene fluoride (PVDF) as a binder, and acetylene black as a conductive material, were added to, and mixed in, N-methyl-2-pyrrolidone (NMP), so as to yield various values of wt % ratios of these materials, and prepare paste-like compositions for forming a positive electrode mix layer.

Each paste-like composition was coated onto both faces of aluminum foil having a thickness of about 15 µm, as a positive electrode collector, so as to yield a coating amount ranging from 12 mg/cm² to 20 mg/cm². After coating, the whole was dried and pressed using a roller press machine, to form a positive electrode mix layer having a layer density ranging from about 1.5 to 2.8 g/cm³, and to prepare eventually a total of 16 positive electrode sheets of samples No. 1 to 16.

Pore Distribution Measurement

Each positive electrode sheet produced as described above was cut to prepare a rectangular specimen having an approximate size of 2 cm×1 cm. The pore distribution in the positive electrode mix layer was measured. The weight of the specimen was about 0.5 g, and the stem volume used was 10 to 25%. A mercury porosimeter ("Auto-Pore 11-9410", by Shimadzu) was used in the measurements. The specimen was placed in a cell, and the pore distribution in the positive electrode mix layer was measured at a pressure from 4 psi to 60000 psi. As described above, the total pore volume per unit mass of the conductive material for pores having a pore size smaller than the pore size P [pun] and that encompass the small pore size peak B was calculated on the basis of a pore distribution curve for a pore size ranging from 0.01 µm to 10 µm (FIG. 1). The measurement results are given in Table 1.

Production of a Negative Electrode of a Test Lithium Secondary Battery

A negative electrode for a test lithium secondary battery was produced next. To form first a negative electrode mix layer of a negative electrode, graphite as a negative electrode active material, and a styrene-butadiene-block copolymer (SBR) plus carboxymethyl cellulose (CMC), as binders, were mixed in deionized water, to yield a wt % ratio of these materials of 98:1:1, and prepare thus a paste-like composition for forming a negative electrode active material layer.

The above paste-like composition was coated onto both faces of a negative electrode collector, in the form of a copper foil about 10 µm thick, to a coating amount of 6.4 to 11 mg/cm² per unit surface area. After coating, the whole was dried and pressed using a roller press machine, to prepare a negative electrode sheet.

Construction of a Test Lithium Secondary Battery

The various positive electrode sheets and the negative electrode sheet produced above were used to construct test lithium secondary batteries. Specifically, each positive electrode sheet and the negative electrode sheet were stacked together with two separators, and the stacked sheet was wound, to produce a wound electrode body. The electrode body was accommodated in a container together with an electrolyte, to construct a 18650-type battery (diameter 18 mm, height 65 mm). As the nonaqueous electrolyte solution there was used a composition resulting from dissolving 1 mol/L of $LiPF_6$ in a mixed solvent of ethylene carbonate (EC), dimethyl carbonate (DMC) and ethyl methyl carbonate (EMC) at 3:4:3 (volume ratio).

Output Characteristic Evaluation

Each battery thus constructed was adjusted to SOC 60% at 1 C constant current, at a measurement temperature of 25° C., and was charged at constant voltage for 2.5 hours.

Charging was followed by a pause of 10 minutes. The battery was discharged then under a given Watt condition, ranging from 5 W to 50 W, from a state of SOC 60%, and the discharge time to 2.5 V was measured. After measurement, the time [seconds] measured up to 2.5 V, under each Watt condition, was plotted in the abscissa axis, and the output [W] at that point in time was plotted in the ordinate axis. The output at a point in time of 10 seconds was calculated on the basis of that approximate curve. The measurement results are given in Table 1.

High Rate Cycle Characteristic Evaluation

Each battery constructed above was adjusted to SOC (State of Charge) 60%, was discharged at 20 C constant current, at a temperature of −15° C., and the initial IV resistance was worked out from the voltage drop after 10 seconds.

Next, each battery was adjusted again to SOC 60%, and a charge and discharge cycle comprising (1) to (4) below was repeated 2500 times, at −15° C., to perform a high-rate cycle test. In the course of the test, the SOC was adjusted to 60% every 100 cycles.

(1) The battery was discharged at 20 C constant current for 10 seconds.
(2) Pause of 5 seconds.
(3) The battery was charged at 1 C constant current for 200 seconds.
(4) Pause of 145 seconds.

Figure 6:
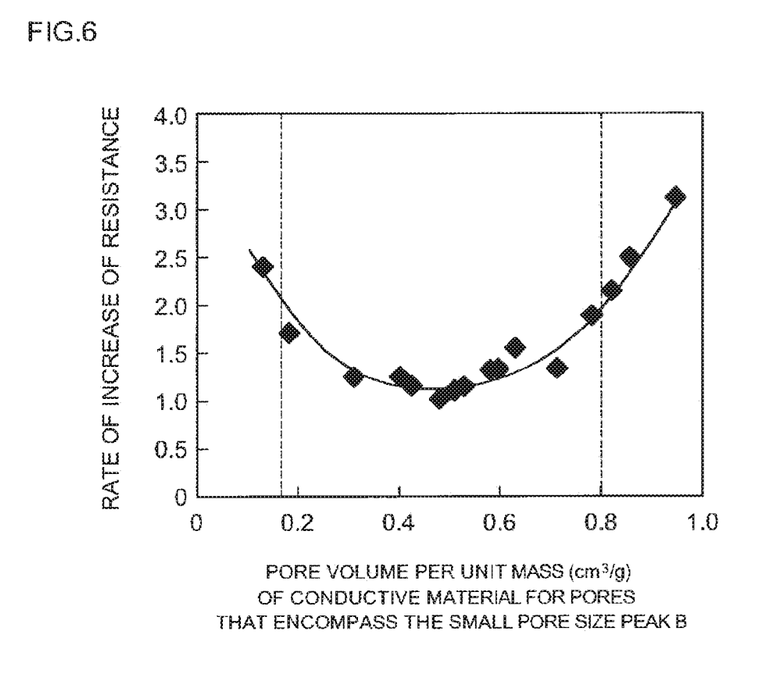
FIG. 6 is a diagram illustrating the relationship between the pore volume per unit mass of a conductive material for pores that encompass a small pore size peak B, and a rate of increase of resistance after high-rate cycling.

Each battery after the above-described high-rate cycle test was measured for IV resistance after high-rate cycling, in the same way as in the measurement of initial IV resistance. The rate of increase of resistance derived from the high-rate cycle test was calculated by dividing the IV resistance value after high-rate cycling by the initial TV resistance value. The measurement results are given in Table 1. FIG. 6 illustrates the relationship between the pore volume per unit mass of the conductive material for the pores that encompass the measured small pore size peak B, and the rate of increase of resistance after high-rate cycling.

TABLE 1

| Sample No. | Pore volume per unit mass [cm³/g] of conductive material for pores that encompass the small pore size peak B | Output [W] | Rate of increase of resistance after high-rate cycling |
|---|---|---|---|
| 1 | 0.131 | 20.1 | 2.40 |
| 2 | 0.183 | 34.5 | 1.71 |
| 3 | 0.311 | 39.6 | 1.25 |
| 4 | 0.402 | 40.3 | 1.25 |
| 5 | 0.425 | 40.9 | 1.16 |
| 6 | 0.481 | 41.4 | 1.02 |
| 7 | 0.510 | 42.5 | 1.11 |
| 8 | 0.529 | 43.1 | 1.15 |
| 9 | 0.581 | 43.2 | 1.32 |
| 10 | 0.597 | 43.7 | 1.33 |
| 11 | 0.630 | 42.4 | 1.55 |
| 12 | 0.713 | 40.2 | 1.34 |
| 13 | 0.782 | 38.6 | 1.89 |
| 14 | 0.821 | 23.2 | 2.15 |
| 15 | 0.857 | 17.2 | 2.50 |
| 16 | 0.947 | 10.1 | 3.12 | pore volume per unit mass [cm³/g] of conductive material for pores that encompass the small pore size peak B = total pore volume (Sb) [cm³/g] that encompasses the small pore size peak B × 1/conductive material weight [g] in positive electrode mix layer.

In sample No. 2 to sample No. 13, where the pore volume per unit mass, ranging from 0.183 cm³/g to 0.782 cm³/g, of the conductive material for pores that encompass the small pore size peak B, the rate of increase of resistance after high-rate cycling takes on a numerical value lower than 2.0, as illustrated in FIG. 6. There was observed a clear correlation between the rate of increase of resistance after high-rate cycling and the pore volume per unit mass of the conductive material for pores that encompass the small pore size peak B.

As Table 1 shows, it was found that, in the above output characteristic evaluation, high output could be maintained over 10 seconds of discharge in sample No. 2 to sample No. 13.

The present invention has been explained in detail above, but the embodiments and examples described above are merely exemplary in character, and the invention as disclosed herein can accommodate various alterations and variations of the above-described specific examples. For instance, the present invention is not limited to the above-described winding-type battery, and may be used in lithium secondary batteries of various shapes. The size and other features of the battery can be modified appropriately depending on the intended application (typically, automotive applications).

INDUSTRIAL APPLICABILITY

Figure 5:
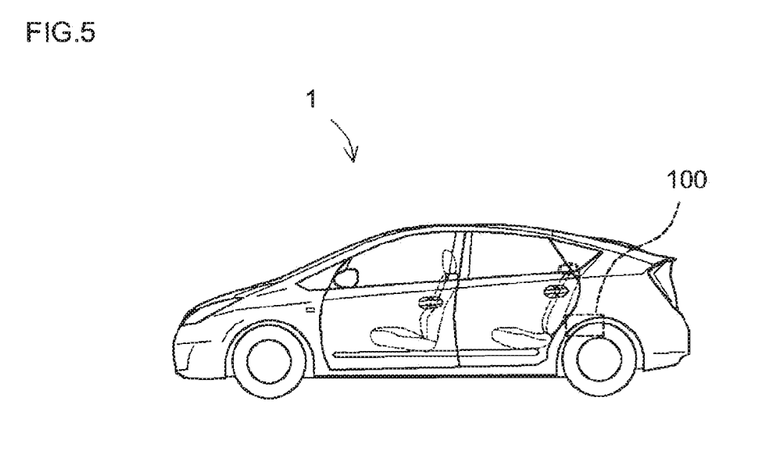
FIG. 5 is side-view diagram illustrating schematically a vehicle (automobile) provided with a lithium secondary battery of the present invention.

The lithium secondary battery 100 according to the present invention has a superior battery characteristic (high-rate characteristic or cycle characteristic) by virtue of the pore distribution associated to the content of conductive material in the positive electrode mix layer. Therefore, the lithium secondary battery 100 according to the present invention can be appropriately used as a power source for motors (electric motors) that are installed, in particular, in vehicles such as automobiles. Accordingly, the present invention provides a vehicle 1 (typically, an automobile, in particular an automobile provided with an electric motor, for instance a hybrid automobile, an electric automobile or a fuel cell automobile) that is equipped with such a lithium secondary battery 100 (and which may be embodied in the form of a battery pack of a plurality of the lithium secondary batteries 100 connected in series), as illustrated in FIG. 5.

The invention claimed is:

1. A method for producing a lithium secondary battery that is provided with a positive electrode that has a positive electrode collector and a positive electrode mix layer that includes, on a surface of the collector, positive electrode active material particles and conductive material particles, the method comprising the steps of:
    forming the positive electrode mix layer on a surface of the positive electrode collector;
    measuring a pore distribution of the positive electrode mix layer using a mercury porosimeter, and selecting a positive electrode such that the pore distribution curve obtained on the basis of the measurement satisfies the conditions below:
    there are two peaks, large and small, of differential pore volume in a pore size ranging from 0.01 μm to 10 μm; and
    from among the large and small peaks, a pore size in a smaller peak B of the differential pore volume is smaller than a pore size in a larger peak A of the differential pore volume, wherein the larger peak A denotes pores derived from gaps between positive electrode active material particles, and the smaller peak B denotes pores derived from gaps between conductive material particles; the method further including
    constructing a lithium secondary battery by using the selected positive electrode.

2. The production method according to claim 1, wherein a positive electrode is selected that exhibits a pore size P

[μm] of a minimum value between the large and small peaks in the pore distribution curve obtained by the measurement ranging from 0.1 μm to 0.7 μm.

3. The production method according to claim 2, wherein a positive electrode is selected that exhibits, as a further condition, a total pore volume per unit mass of the conductive material for pores having a pore size smaller than the pore size P [μm] and encompassing the small pore size peak B, in the pore distribution curve obtained by the measurement, satisfying a range of 0.18 cm$^3$/g to 0.8 cm$^3$/g.

* * * * *